US010068470B2

(12) United States Patent
Pundurs

(10) Patent No.: US 10,068,470 B2
(45) Date of Patent: Sep. 4, 2018

(54) DETERMINATION OF AN AVERAGE TRAFFIC SPEED

(71) Applicant: HERE Global B.V., Eindhoven (NL)

(72) Inventor: Mark Pundurs, Des Plaines, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/148,126

(22) Filed: May 6, 2016

(65) Prior Publication Data

US 2017/0323563 A1 Nov. 9, 2017

(51) Int. Cl.
*G06F 19/00* (2011.01)
*G06G 7/70* (2006.01)
(Continued)

(52) U.S. Cl.
CPC ........... *G08G 1/052* (2013.01); *G08G 1/0112* (2013.01); *G08G 1/0129* (2013.01); *G08G 1/091* (2013.01)

(58) Field of Classification Search
CPC ....... G08G 1/096775; G08G 1/096844; G08G 1/127; G08G 1/096883; G08G 1/14; G08G 1/163; G08G 1/096791; G08G 1/09685; G08G 1/0112; G08G 1/0145; G08G 1/096811; G08G 1/07; G01C 21/165; G01C 21/26; G01C 21/3476; G01C 21/3484; G01C 21/3626; G01C 21/3492;
(Continued)

(56) References Cited

U.S. PATENT DOCUMENTS 5,444,442 A * 8/1995 Sadakata .................. G08G 1/08
340/916
5,589,827 A * 12/1996 Scurati ................... G08G 1/163
180/167
(Continued)

FOREIGN PATENT DOCUMENTS

EP 2278573 1/2011

OTHER PUBLICATIONS

Baricevic et al., Traffic Flow Characteristics with Transportation Plans Components, Jan. 12, 1998, pp. 113-116, vol. 10,No. 3, Traffic Planning Review.

(Continued)

*Primary Examiner* — Jelani A Smith
*Assistant Examiner* — Luis A Martinez Borrero
(74) *Attorney, Agent, or Firm* — Lempia Summerfield Katz LLC

(57) ABSTRACT

Navigation devices, services, and methods are provided for determining an average traffic speed for a path segment using probe data from a plurality of navigation devices. The method for determining an average traffic speed may include retrieving probe data from a plurality of navigation devices, each navigation device traveling over at least a portion of a defined path segment for at least a portion of a defined time interval, wherein the probe data for each navigation device comprises an instantaneous velocity of the navigation device. The method may further include calculating a total distance traveled and a total time traveled by the plurality of navigation devices over the path segment and within the time interval using the instantaneous velocities from the retrieved probe data. The average traffic speed may then be determined based on the calculated total distance traveled and total time traveled.

19 Claims, 6 Drawing Sheets

(51) Int. Cl.
*G06G 7/76* (2006.01)
*G08G 1/00* (2006.01)
*G08G 1/052* (2006.01)
*G08G 1/01* (2006.01)
*G08G 1/09* (2006.01)

(58) Field of Classification Search
CPC ............ G01C 21/3469; G01C 21/3617; G01C 21/3658; G01C 21/3415; G01C 21/36; G01C 21/34
USPC ..... 701/117, 119, 118, 22, 410, 423, 2, 409, 701/468
See application file for complete search history.

(56) References Cited

U.S. PATENT DOCUMENTS

| | | | | | |
|---|---|---|---|---|---|
| 6,178,374 | B1* | 1/2001 | Mohlenkamp | G08G 1/096716 | 340/905 |
| 6,202,024 | B1* | 3/2001 | Yokoyama | G01C 21/26 | 701/24 |
| 6,587,779 | B1* | 7/2003 | Kerner | G08G 1/0104 | 340/909 |
| 7,508,321 | B2* | 3/2009 | Gueziec | G01C 21/3492 | 340/905 |
| 7,519,564 | B2* | 4/2009 | Horvitz | G06N 99/005 | 701/27 |
| 7,706,964 | B2* | 4/2010 | Horvitz | G01C 21/3492 | 342/357.31 |
| 7,821,421 | B2* | 10/2010 | Tamir | G06Q 30/0283 | 340/425.5 |
| 7,893,849 | B2* | 2/2011 | Poltorak | G08G 1/0969 | 340/905 |
| 8,290,695 | B2* | 10/2012 | Hiestermann | G01C 21/32 | 15/42 |
| 8,666,643 | B2* | 3/2014 | McBride | H04L 41/0823 | 340/907 |
| 8,692,690 | B2* | 4/2014 | Dalal | G01S 11/12 | 340/933 |
| 8,712,676 | B2* | 4/2014 | Hiestermann | G01C 21/32 | 180/65.26 |
| 9,053,632 | B2* | 6/2015 | Shen | G08G 1/0129 | |
| 9,558,660 | B1* | 1/2017 | Fowe | G08G 1/0112 | |
| 9,582,999 | B2* | 2/2017 | Lewis | G08G 1/0112 | |
| 9,697,731 | B2* | 7/2017 | Bradley | G08G 1/0141 | |
| 2004/0243301 | A1* | 12/2004 | Kim | G01C 21/3492 | 701/533 |
| 2005/0251323 | A1* | 11/2005 | Heinrichs-Bartscher | B60K 31/0008 | 701/117 |
| 2007/0208492 | A1* | 9/2007 | Downs | G08G 1/0104 | 701/117 |
| 2007/0208494 | A1* | 9/2007 | Chapman | G08G 1/0104 | 701/117 |
| 2007/0208495 | A1* | 9/2007 | Chapman | G08G 1/0104 | 701/117 |
| 2007/0208496 | A1* | 9/2007 | Downs | G08G 1/0112 | 701/117 |
| 2007/0294023 | A1* | 12/2007 | Arcot | G08G 1/0104 | 701/117 |
| 2008/0242315 | A1* | 10/2008 | Ferman | G08G 1/0104 | 455/456.2 |
| 2010/0082226 | A1* | 4/2010 | Mukherjee | G08G 1/0104 | 701/118 |
| 2010/0318286 | A1* | 12/2010 | Lorkowski | G01S 19/48 | 701/119 |
| 2011/0106416 | A1* | 5/2011 | Scofield | G08G 1/0104 | 701/119 |
| 2011/0307165 | A1* | 12/2011 | Hiestermann | G01C 21/32 | 701/119 |
| 2011/0307166 | A1* | 12/2011 | Hiestermann | G01C 21/32 | 701/119 |
| 2012/0265428 | A1* | 10/2012 | Zaitsu | G08G 1/0104 | 701/118 |
| 2014/0005916 | A1* | 1/2014 | Shen | G08G 1/0129 | 701/119 |
| 2015/0206428 | A1* | 7/2015 | Kurzhanskiy | G08G 1/052 | 701/119 |
| 2016/0025510 | A1* | 1/2016 | Belzner | G08G 1/0112 | 701/533 |

OTHER PUBLICATIONS

Immers et al., Traffic Flow Theory, May 2002, Section Traffic and Infrastructure, Heverlee, Belgium.

Ni et al., Direct Methods of Determining Traffic Stream Characteristics by Definition, Jul. 15, 2004, Transportation Research Record.

Dr. Henry Lieu, "Revised Monograph on Traffic Flow Theory", Federal Highway Administration Research and Technology, pp. 1-367, Apr. 25, 2012.

"Traffice Stream Characteristics", Federal Highway Administration, 1992, 365 pages.

Daiheng Ni, "Lecture Notes in Traffic Flow Theory: A Unified Perspective", Chapter 4, 2013, 16 pages, University of Massachusetts, Amherst.

* cited by examiner

DETERMINATION OF AN AVERAGE TRAFFIC SPEED

FIELD

The following disclosure relates to navigation devices and services, or more particularly, to navigation devices, services, and methods for determining an average traffic speed for a path segment (e.g., road segment).

BACKGROUND

Commuters, commercial drivers, and departments of transportation derive value from knowing average traffic speeds at particular places and times. A common approach for averaging the speeds of multiple vehicles is to calculate harmonic mean, or "space mean speed" of the multiple vehicles. Space mean speed, however, may only provide an accurate result when measurements are taken at a single location or over a short distance (e.g., a stationary traffic sensor spanning a few meters). Therefore, determination of an average speed over a lengthier path segment (e.g., greater than a few meters) is a continuing effort.

SUMMARY

Navigation devices, services, and methods are provided for determining an average traffic speed for a path segment. In one embodiment, the method for determining an average traffic speed using a plurality of navigation devices includes providing a path segment having a starting location and an ending location; providing a time interval having a staring time and an ending time; retrieving probe data, by a processor, from the plurality of navigation devices, each navigation device traveling over at least a portion of the path segment for at least a portion of the time interval, wherein the probe data for each navigation device comprises an instantaneous velocity of the navigation device; calculating, by the processor, a total distance traveled and a total time traveled by the plurality of navigation devices over the path segment and within the time interval using the instantaneous velocities from the retrieved probe data; and determining, by the processor, the average traffic speed for the path segment and time interval based on the calculated total distance traveled and the total time traveled.

In another embodiment, a method for receiving an average traffic speed using a plurality of navigation devices includes providing a path segment having a starting location and an ending location; providing a time interval having a staring time and an ending time, wherein the path segment and time interval are defined by an end-user computing device in communication with a processor; retrieving probe data, by the processor, from the plurality of navigation devices, each navigation device traveling over at least a portion of the path segment for at least a portion of the time interval, wherein the probe data for each navigation device comprises an instantaneous velocity of the navigation device, a geographic location of the navigation device, and a timestamp associated with the geographic location and the instantaneous velocity; calculating, by the processor, a total distance traveled and a total time traveled by the plurality of navigation devices over the path segment and within the time interval using the instantaneous velocities of the plurality of navigation devices; determining, by the processor, the average traffic speed for the path segment and time interval based on the calculated total distance traveled and the total time traveled; and transmitting, over the connected network, the determined average traffic speed to the end-user computing device.

Apparatuses are also provided for determining an average traffic speed using probe data transmitted from navigation devices traveling within a path segment within a defined time period. In one embodiment, the apparatus comprises at least one processor and at least one memory including computer program code for one or more programs, wherein the at least one memory and the computer program code configured to, with the at least one processor, cause the apparatus to at least perform: (1) retrieve probe data from a plurality of navigation devices, each navigation device traveling over at least a portion of a path segment for at least a portion of a time interval, wherein the path segment comprises a starting location and an ending location and the time interval comprises a starting time and an ending time, and wherein the probe data for each navigation device comprises an instantaneous velocity of the navigation device, a geographic location of the navigation device, and a timestamp associated with the geographic location and the instantaneous velocity; (2) calculate a total distance traveled and a total time traveled by the plurality of navigation devices over the path segment and within the time interval using the instantaneous velocities of the plurality of navigation devices; and (3) determine the average traffic speed for the path segment and time interval based on the calculated total distance traveled and the total time traveled.

BRIEF DESCRIPTION OF THE DRAWINGS

Exemplary embodiments are described herein with reference to the following drawings.

DETAILED DESCRIPTION

The following embodiments include navigation devices, services, systems, apparatuses, and methods for determining an average traffic speed for a path segment. The average traffic speed may be determined using an algorithm based on a relationship between a calculated total distance traveled for all of the navigation devices traveling through the path segment and a calculated total time traveled for the navigation devices.

As used herein, a "path segment" may refer to any segment of a traveling lane or pathway that may be capable of being monitored for traffic congestion/incident detection, or may become capable of being monitored for traffic congestion/incident detection in the future. For example, the path segment may be a segment of a highway, city street, bus route, train route, walking/biking pathway, or waterway.

As used herein, a "navigation device" may be a smart phone, a mobile phone, a personal digital assistant ("PDA"), a tablet computer, a notebook computer, a personal navigation device ("PND"), a portable navigation device, vehicle navigation system, and/or any other known or later developed mobile device. In certain embodiments, the navigation device is installed or transported in or on a vehicle (e.g., car, truck, motorcycle, bicycle, bus) or transported on a traveler. In certain embodiments, the navigation device generates a message that provides the navigation device's geographic location and sends the message to a connected server over a communication network.

This algorithms and techniques described herein may provide improved average speed calculations in comparison to conventional algorithms and techniques, such as a harmonic average calculation. A harmonic mean or space mean speed may be calculated as $N/\Sigma_i(1/v_i)$, wherein N is the total number of samples and $v_i$, is the velocity for the $i^{th}$ navigation device.

For example, the algorithms and techniques described herein may allow for a more accurate calculation when one or more of the probe data points being analyzed reports a velocity that is much lower than other velocity measurements (including a velocity of zero). In such a case where the velocity is zero, the harmonic average is also zero, despite the presence of non-zero speeds. This result may be avoided in the harmonic average calculation by artificially excluding the zero speeds from the harmonic average calculation. By contrast, the algorithms and techniques described herein inherently handle zero speeds and return a non-zero result.

The various algorithms and techniques are described in further detail below.

I. Defining Path Segment and Time Interval for Calculation

Figure 1:
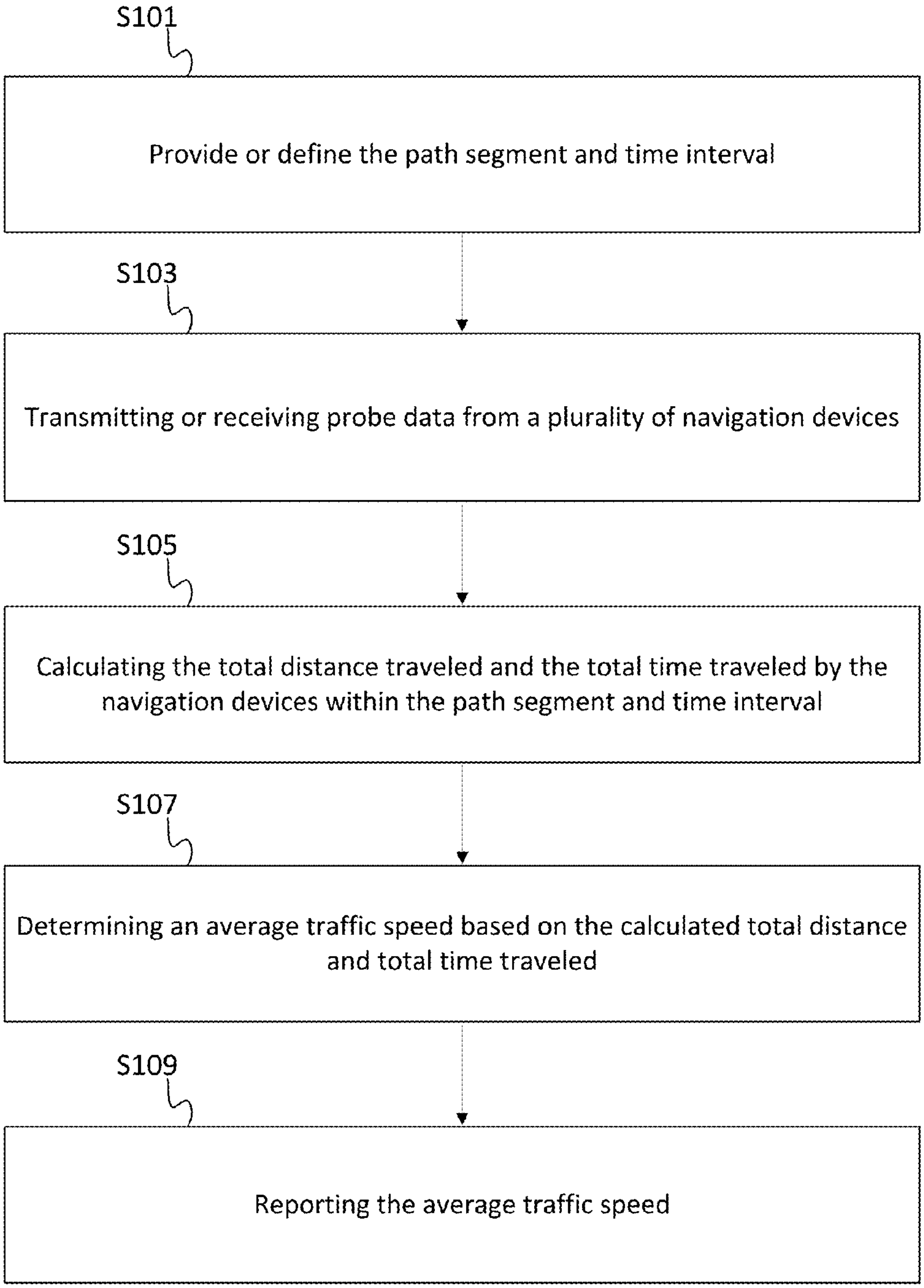
FIG. 1 illustrates an example flowchart for determining an average traffic speed.

FIG. 1 illustrates an example flowchart for determining an average traffic speed. The process of the flowchart may be performed by a server and processor, which may be referred to alternatively as the controller in the description below. Alternatively, another computing device may be configured to perform one or more of the following acts. Additional, fewer, or different acts may be included.

In order to determine an average traffic speed over a path segment, the length of the path segment and a time interval for the calculation are provided or defined.

At act S101, a server or processor may provide the length of the path segment and the time interval for the calculation of the average speed. In certain examples, a third-party defines the path segment and/or time interval and transmits the defined path segment and/or the time interval to the server or processor for further processing. The third-party may be an end-user operating a computing device, such as a personal computer, server computer, tablet or other handheld computing device, laptop or mobile computer, gaming system, communication device such as a mobile phone, multiprocessor system, microprocessor-based system, programmable consumer electronic, network PC, minicomputer, or mainframe computer. In certain examples, the computing device may be a navigation device. In some examples, the navigation device may be positioned within or travelling within the defined path segment.

Regarding the path segment, in certain examples, a starting location and an ending location for the path segment may be defined or provided. Alternatively, a single location of the path segment may be initially provided and the server or processor may subsequently determine a length of the path segment that includes the single provided location. For example, the provided location may be a central location of the path segment, such that the starting location and the ending location are equidistant from the provided location. In other examples, the provided location may be the starting or the ending location, and the opposite location may be determined. In some examples, a default path segment length may be determined based on the single location provided.

Any length between the starting location and the ending location may be possible. In some examples, the length of the path segment is at least 1 meter, 10 meters, 100 meters, 1 kilometer, or 10 kilometers. In other examples, the length of the path segment is from 1 m-10 m, 1 m-100 m, 1 m-1 km, 10 m-100 m, 10 m-1 km, 100 m-1 km, or 1 km-10 km.

In certain examples, the starting location and the ending location are provided along a common pathway (e.g., along the same highway, city street, bus route, train route, or walking/biking pathway).

Regarding the time interval, in certain examples, a starting time and an ending location for collecting data from navigation devices traveling along the path segment may be defined or provided. Alternatively, a single time may be initially provided and the server or processor may subsequently determine the length of the time interval that includes the single provided time. For example, the provided time may be a central time of the time interval, such that the starting time and the ending time are equidistant from the provided time. In other examples, the provided time may be the starting or the ending time, and the opposite time of the time interval may be determined. In some examples, a default time interval may be determined based on the single time provided.

Any length of time between the starting time and the ending time may be possible. In some examples, the length of the time interval is at least 1 second, 15 seconds, 30 seconds, 1 minute, 15 minutes, 30 minutes, or 1 hour. In other examples, the length of the time interval is from 1 second-15 seconds, 1 second-30 seconds, 1 second-1 minute, 15 seconds-1 minute, 1 minute-15 minutes, 1 minute-30 minutes, 1 minute-1 hour, 15 minutes-30 minutes, or 30 minutes-1 hour.

II. Provide/Receive Probe Data

An average traffic speed may be determined for the defined path segment at the defined time interval. The determination may be made based on probe data provided by a plurality of navigation devices traveling over at least a portion of the path segment for at least a portion of the time interval.

At act S103, as depicted in FIG. 1, probe data may be transmitted from a navigation device and received by a processor via a connected network. The probe data may include a geographic location, an instantaneous velocity, a heading (or trajectory), a timestamp, and/or an identification (e.g., vehicle identification) associated with the navigation device. The probe data may be determined through Global Positioning System (GPS) or another technique. The probe data may include speed, heading, location, timestamp, etc., as obtained from a single sensor such as GPS or a combination of sensors such as GPS, accelerometer, and gyrometer. In certain embodiments, the navigation device generates a message that provides at least one of (1) geographic location, (2) speed, (3) heading, and (4) vehicle identification (including timestamp), and sends the message to the server over a connected network.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The navigation device may transmit probe data, and the processor may receive the transmitted probe data in real-time (e.g., as the navigation device is traveling over the path segment). In some examples, the probe data may be collected and stored on the navigation device and transmitted to the processor at specific periods of time (e.g., every 5 seconds, 15 seconds, 1 minute, etc.) and/or when the navigation device has traveled over a defined length of the path segment (e.g., every 10 meters, 100 meters, 500 meters, 1 kilometer, etc.).

In some examples, the navigation device may not be connected to the network but may still be collecting probe data. The probe data may be collected and stored on the navigation device and transmitted to the processor when the navigation device becomes connected to the network.

In some examples, the collection of probe data from one or more navigation devices may be incomplete for the entire length of the path segment, such that probe data may not exist at one or more locations over the length of the path segment. This may be due to the navigation device being turned off during a portion of the path segment, the navigation device having a poor network connection, the navigation device having a poor Global Positioning System (GPS) signal, or any other interference problem preventing the collection of accurate probe data.

As described in the section below, the calculations used to determine an average traffic speed do not require a complete travel path across the path segment and/or over the time interval. This is advantageous as more probe data may be collected and analyzed, even if it is considered incomplete. For example, probe data from a navigation device may be transmitted and analyzed by the processor even if it includes a partial navigation path within the path segment and time interval that includes none of the following or a maximum of one of the following: (1) a beginning of the partial navigation path at the starting location of the path segment, (2) a beginning of the partial navigation path at the starting time of the time interval, (3) an ending of the partial navigation path at the ending location of the path segment, or (4) an ending of the partial navigation path at the ending time of the time interval.

Figure 2:
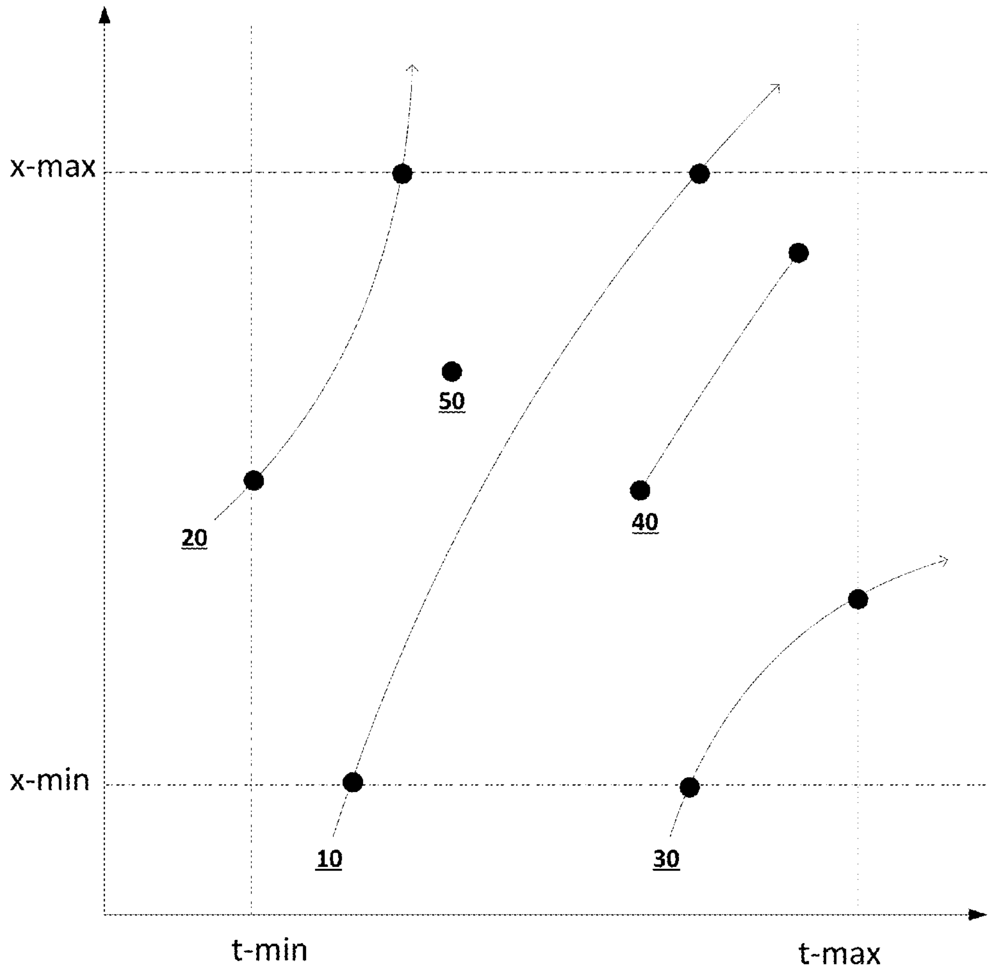
FIG. 2 illustrates an example of a plurality of navigation devices traveling within a path segment and time interval.

FIG. 2 illustrates an example of a plurality of navigation devices traveling within a path segment and time interval. In this example, probe data is being collected and transmitted by a plurality of navigation devices (e.g., vehicles) over the defined path segment (e.g., road segment) and time interval. The path segment has a defined starting location (x-min) and an ending location (x-max). The time interval has a defined starting time (t-min) and an ending time (t-max).

Probe data may be collected from a variety of different navigation devices traveling within the window between x-min, x-max, t-min, and t-max. A navigation device 10 may travel over the entire path segment and within the time interval. Probe data may be collected and reported to the processor for the entire length and entire time within the window. An additional navigation device 20 may report probe data for its journey traveling over part of path segment within part of time interval (starting at beginning of time interval). An additional navigation device 30 may report probe data for its journey traveling over part of path segment within part of time interval (starting at beginning of path segment). An additional navigation device 40 may report probe data for its partial journey within the path segment and time interval. The journey may be "partial" due to a poor network connection or inability to collect or transmit probe data within the remainder of the window (e.g., the network device may have been turned off for part of the path). Finally, a navigation device 50 may collect and report probe data at a single location and time within the window.

In certain examples, the processor may make a request for probe data for a defined path segment and time interval. In some examples, the request is for real-time probe data (i.e., the time interval includes the present time). In other examples, the request is for historical probe data. Such historical data may be used for analyzing trends in traffic patterns or comparing historical data with real-time data. The historical data may be retrieved from a database connected to the processor. The historical data may be retrieved from a specific time of day, day of the week, and/or day of the month.

In some examples, the historical data may be used to determine an "expectation value" for incomplete probe data. For example, based on historical data, a predicted or expected travel distance and travel time may be calculated for a navigation device. In other words, a navigation device may only transmit its instantaneous velocity. This data may be combined with an average travel distance and average travel time for a navigation device traveling over the navigation path, e.g., at a similar velocity.

III. Calculating Total Distance Traveled and Total Time Traveled

At act S105, as depicted in FIG. 1, the processor may calculate the total distance traveled by the navigation devices and the total time traveled using the retrieved probe data.

In one example, the total distance traveled and the total time traveled may be calculated using several variables collected from the retrieved probe data, including (1) instantaneous velocity, (2) geographic location on the path segment, and (3) timestamp associated with the velocity and geographic location.

The total distance traveled may be a sum of the navigation device probe data, as represented in equation (1) below:

$$\text{Total distance}=\Sigma_i[\min(x_{max}, v_i(t_{max}-t_i)+x_i)-\max(x_{min}, v_i(t_{min}-t_i)+x_i)] \tag{1}$$

wherein:

i refers to an $i^{th}$ navigation device of the plurality of navigation devices, $v_i$=the instantaneous velocity of the $i^{th}$ navigation device, $x_i$=the geographic location of the $i^{th}$ navigation device, $t_i$=the timestamp of the $i^{th}$ navigation device, $x_{min}$=the starting location of the path segment, $x_{max}$=the ending location of the path segment, $t_{min}$=the starting time of the time interval, and $t_{max}$=the ending time of the time interval.

The total time traveled may be represented by the same variables in equation (2) below:

$$\text{Total time}=\Sigma_i\left[\min(t_{max}, (x_{max}-x_i)/v_i+t_i)-\max\left(t_{min}, \frac{(x_{min}-x_i)}{v_i}+t_i\right)\right] \tag{2}$$

The calculations in equations (1) and (2) are advantageous as they take into account situations where probe data is collected for a navigation device for a portion but not necessarily all of the path segment during the specified time interval. In comparison, a harmonic average calculation implicitly assumes that every vehicle passes over the entire length of the road segment.

Application of the calculations in equations (1) and (2) takes into account not only the individual navigation device speeds but also the times and distances along the path segment at which the speeds were recorded.

In certain examples, use the time and distance variables may be avoided by approximating each navigation device's distance traveled as the average (or "expectation value") of distance traveled assuming a uniform probability distribution in position and time across the path segment, and making a corresponding approximation for its travel time. As noted above, the expectation value may be determined using historical probe data.

In other words, the total distance traveled and the total time traveled may be calculated using only the instantaneous velocity of the navigation device. A calculation for the total distance traveled may be represented in equation (3) below:

$$\text{Total distance} = \sum_{v_i \le v_c} v_i \Delta t\left(1 - \frac{v_i}{3v_c}\right) + \sum_{v_i > v_c} \Delta x\left(1 - \frac{v_c}{3v_i}\right) \tag{3}$$

wherein:

i refers to an $i^{th}$ navigation device of the plurality of navigation devices, $v_i$=the instantaneous velocity of the $i^{th}$ navigation device, $\Delta x$=a spatial length of the road segment, $\Delta t$=a duration of the time interval, and $v_c$=the characteristic velocity as defined by $\Delta x/\Delta t$.

The total time traveled may be represented by the same variables in equation (4) below:

$$\text{Total distance} = \sum_{v_i \le v_c} \Delta t\left(1 - \frac{v_i}{3v_c}\right) + \sum_{v_i > v_c} \frac{\Delta x}{v_i}\left(1 - \frac{v_c}{3v_i}\right) \tag{4}$$

In these calculation for total distance traveled and total time traveled, in the first summations, the fraction $v_i/3v_c$ accounts for cases where slow-moving navigation devices are on the path segment for less than the full time interval $\Delta t$. This relationship was determined as follows:

$$E(t) = \frac{\int tdxdt}{\int dxdt} = \frac{\Delta t(\Delta x - v\Delta t)\Delta t + 2\int_{t=0}^{t=\Delta t} tdt \int_{x=0}^{x=vt} dx}{\Delta x \Delta t}$$

$$= \frac{\left(\Delta t - \frac{\Delta x}{v}\right)(\Delta x)^2 + 2\int_{t=0}^{t=\Delta t} vt^2 dt}{\Delta x \Delta t} = \frac{(\Delta x - v\Delta t)(\Delta t)^2 + 2v\frac{(\Delta t)^3}{3}}{\Delta x \Delta t}$$

$$= \Delta t\left(1 - \frac{v}{3v_c}\right)$$

$$E(x) = vE(t) = v\Delta t\left(1 - \frac{v}{3v_c}\right)$$

In the second summations, the fraction $v_c/3v_i$ accounts for cases where fast-moving vehicles are on the road segment for less than its full length $\Delta x$. This relationship was determined as follows:

$$E(x) = \frac{\int xdxdt}{\int dxdt} = \frac{\Delta x\left(\Delta t - \frac{\Delta x}{v}\right)\Delta x + 2\int_{x=0}^{x=\Delta x} xdx \int_{t=0}^{t=\frac{x}{v}} dt}{\Delta x \Delta t}$$

$$= \frac{\left(\Delta t - \frac{\Delta x}{v}\right)(\Delta x)^2 + 2\int_{x=0}^{x=\Delta x} x^2 \frac{dx}{v}}{\Delta x \Delta t} = \frac{\left(\Delta t - \frac{\Delta x}{v}\right)(\Delta x)^2 + \frac{2(\Delta x)^3}{3v}}{\Delta x \Delta t}$$

$$= \Delta x\left(1 - \frac{v_c}{3v}\right)$$

$$E(t) = \frac{E(x)}{v} = \frac{\Delta x}{v}\left(1 - \frac{v_c}{3v}\right)$$

IV. Determining Average Traffic Speed

At act S107, as depicted in FIG. 1, the average traffic speed for the path segment and time interval may be determined by dividing the calculated total distance traveled by the calculated total time traveled.

In one example, the average traffic speed is determined by dividing the result of equation (1) by the result from equation (2). The average traffic speed, $\overline{v}$, is represented in equation (5):

$$\overline{v} = \frac{\Sigma_i[\min(x_{max}, v_i(t_{max} - t_i) + x_i) - \max(x_{min}, v_i(t_{min} - t_i) + x_i)]}{\Sigma_i[\min(t_{max}, (x_{max} - x_i)/v_i + t_i) - \max(t_{min}, (x_{min} - x_i)/v_i + t_i)]} \tag{5}$$

In another example, the average traffic speed is determined by dividing the result of equation (3) by the result from equation (4). The average traffic speed, $\overline{v}$, is represented in equation (6):

$$\overline{v} = \frac{\sum_{v_i \le v_c} v_i \Delta t\left(1 - \frac{v_i}{3v_c}\right) + \sum_{v_i > v_c} \Delta x\left(1 - \frac{v_c}{3v_i}\right)}{\sum_{v_i \le v_c} \Delta t\left(1 - \frac{v_i}{3v_c}\right) + \sum_{v_i > v_c} \frac{\Delta x}{v_i}\left(1 - \frac{v_c}{3v_i}\right)} \tag{6}$$

The expression reduces to the harmonic mean only when all vehicle speeds are much greater than $v_c$. As such, one improvement over the harmonic average is the case where one or more vehicle speeds are zero. In such an example, the harmonic average is also zero, despite the presence of non-zero speeds. As noted above, this result may be avoided only by artificially excluding the zero speeds from the harmonic average calculation. By contrast, the above formula inherently handles zero speeds and returns a non-zero result.

An example is provided below to demonstrate the differences between an arithmetic mean calculation, a harmonic mean calculation, and the improved mean calculation. In this example, the path segment has a length, $\Delta x$, of 7.44 km, and a time interval, $\Delta t$, of 5 minutes. As such, the characteristic velocity, $v_c$, (or $\Delta x/\Delta t$) is 89.3 km/hr. Five navigation devices, traveling within the path segment and time interval, have transmitted probe data to a processor for analysis. The probe data included the instantaneous velocities of the navigation devices. These velocities were used to determine an average traffic speed using three different methods.

TABLE 1

| Navigation Device | $V_i$ Speed (km/hr) | $1/V_i$ | $v_i\Delta t\left(1-\frac{v_i}{3v_c}\right)$ or $\Delta x\left(1-\frac{v_c}{3v_i}\right)$ | $\Delta t\left(1-\frac{v_i}{3v_c}\right)$ or $\frac{\Delta x}{v_i}\left(1-\frac{v_c}{3v_i}\right)$ |
|---|---|---|---|---|
| 1 | 75 | 0.013 | 4.500 | 0.060 |
| 2 | 91 | 0.011 | 5.006 | 0.055 |
| 3 | 36 | 0.028 | 2.597 | 0.072 |
| 4 | 89 | 0.011 | 4.953 | 0.056 |
| 5 | 95 | 0.011 | 5.109 | 0.054 |
| | | Harmonic Average $N\Big/\sum_i (1/v_i) = 5/0.074 = 67.7$ | Numerator of equation (6) = 22.165 | Denominator of equation (6) = 0.297 |

Based on these five samples, the arithmetic mean is 77.2 km/hr. The harmonic mean is 67.7 km/hr. Finally, the improved mean calculation using equation (6) above is 74.7 km/hr.

As noted in the table above, the instantaneous speed for vehicle 3 is much less than the other four samples. Further, the speeds for vehicle 1 (75 km/hr) and vehicle 3 (36 km/hr) are less than the characteristic velocity, $v_c$ (89.3 km/hr). Taking this slower-moving samples into account, the harmonic mean and improved mean calculation diverge. As such, a more representative calculation is provided for the average speed for the path segment using the improved mean calculation (as described in equation (6)).

V. Reporting Average Traffic Speed

At act S109, as depicted in FIG. 1, the determined average traffic speed may be reported to an end-user computing device over a connected network. As described above, the end-user computing device may be as a personal computer, server computer, tablet or other handheld computing device, laptop or mobile computer, gaming system, communication device such as a mobile phone, multiprocessor system, microprocessor-based system, programmable consumer electronic, network PC, minicomputer, or mainframe computer. In certain examples, the end-user computing device may be a navigation device.

In alternative examples, the determined average traffic speed may be reported to a map developer or other business computing device for collecting, analyzing, and/or reporting traffic patterns.

In certain examples, the process described in acts S101-S109 may be repeated, wherein a new or updated traffic speed may be determined for a same or different path segment and time interval. For example, the traffic speed may be updated for a same path segment in a new time interval to account for real-time probe data updates. In such an example, only probe data from the most recent time interval is used (e.g., probe data within the last minute, 5 minutes, 10 minutes, 15 minutes, 30 minutes, 1 hour). In certain examples, the average traffic speed determined in a prior calculation may be used for calculating an expectation value in an updated calculation.

VI. Additional Embodiments

Figure 3:
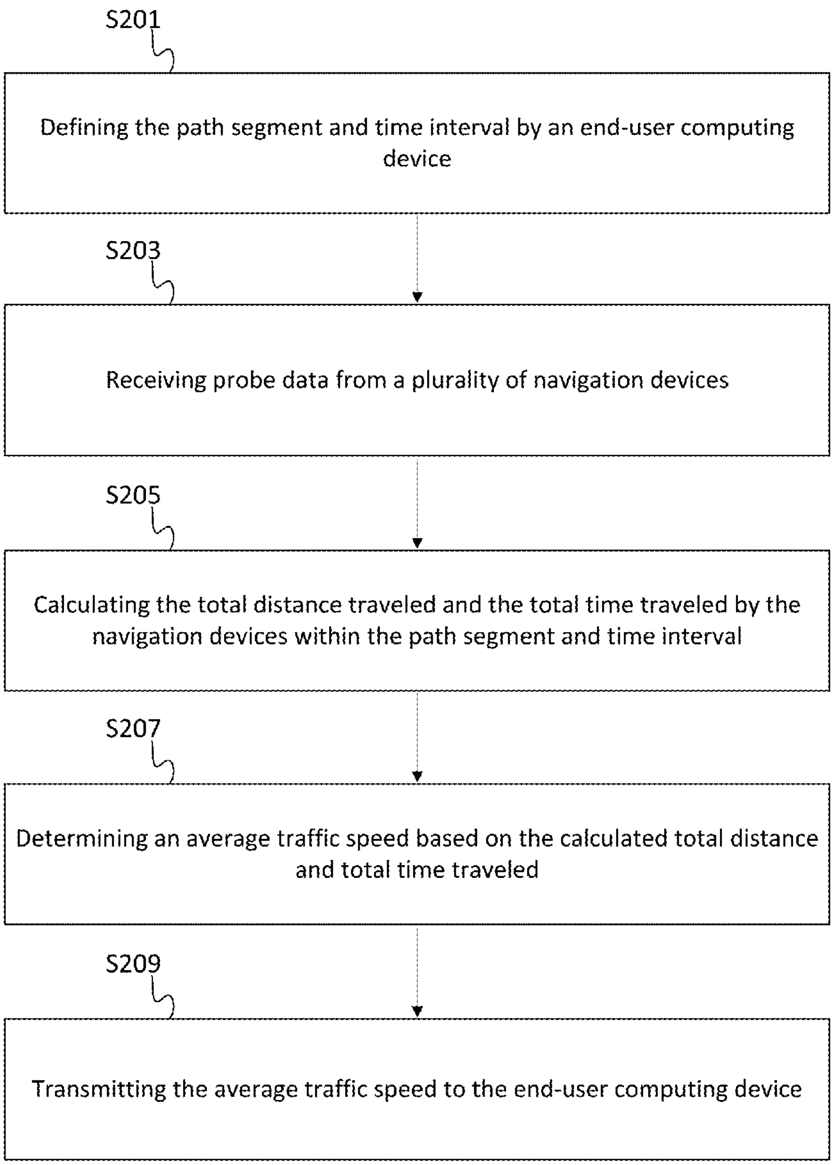
FIG. 3 illustrates an additional example flowchart for determining an average traffic speed.

FIG. 3 illustrates an additional example flowchart for determining an average traffic speed. The process of the flowchart may be performed by a server 125 and processor 300, which may be referred to alternatively as the controller in the following description. Alternatively, another device may be configured to perform one or more of the following acts. Additional, fewer, or different acts may be included.

At act S201, a third-party end-user computing device defines the length of the path segment and the time interval for the calculation of the average speed. The defined path segment and time interval may then be provided to a processor over a connected network. In some examples, the end-user computing device is a navigation device that is travelling within, or planning to travel within, the defined path segment (and defined time interval).

At act S203, similar to act 103 described above, probe data may be transmitted from a navigation device and received by a processor via a connected network. At act S205, the processor may calculate the total distance traveled by the navigation devices and the total time traveled using the retrieved probe data. Examples of these calculations are described above. At act S207, the average traffic speed for the path segment and time interval may be determined by dividing the calculated total distance traveled by the calculated total time traveled.

At act S209, the determined average traffic speed may be reported to the same end-user computing device that defined the path segment and time interval.

VII. Navigation Devices and Systems

Figure 4:
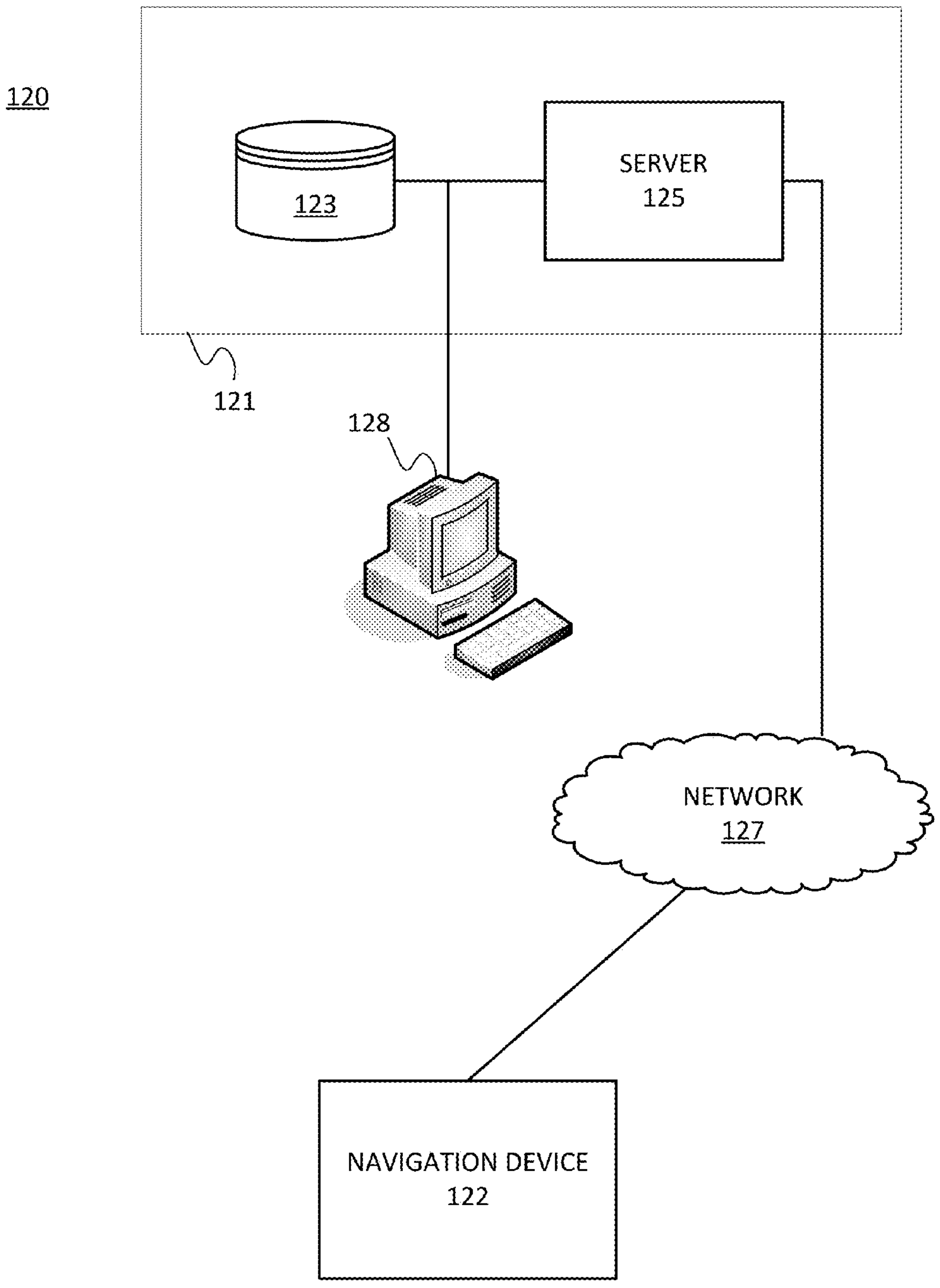
FIG. 4 illustrates an example system for requesting or determining an average traffic speed based on input from a navigation device.

FIG. 4 illustrates an exemplary navigation system 120 for determining an average traffic speed. The navigation system 120 includes a developer system 121 (e.g., a map developer system), a navigation device 122, a workstation 128, and a network 127. Additional, different, or fewer components may be provided.

As noted above, the navigation device 122 may be a smart phone, a mobile phone, a personal digital assistant ("PDA"), a tablet computer, a notebook computer, a personal navigation device ("PND"), a portable navigation device, vehicle navigation system, and/or any other known or later developed mobile device. In certain embodiments, the device 122 is installed or transported in or on a vehicle (e.g., car, truck, motorcycle, bicycle, bus) or transported on a traveler. In certain embodiments, the navigation device 122 generates a message that provides the device's geographic location and sends the message to the server 125.

In certain embodiments, the navigation device 122 is transported in or on an autonomous vehicle or a highly automated driving (HAD) vehicle. As described herein, an "autonomous vehicle" may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. As described herein, a “highly automated driving (HAD) vehicle” may refer to a vehicle that does not completely replace the human operator. Instead, in a highly automated driving mode, the vehicle may perform some driving functions and the human operator may perform some driving functions. Vehicles may also be driven in a manual mode in which the human operator exercises a degree of control over the movement of the vehicle. The vehicle may also include a completely driverless mode. Other levels of automation are possible.

The developer system 121 includes a server 125 and a database 123. The developer system 121 may include computer systems and networks of a system operator. The server database 123 is configured to store historical traffic data and/or real-time traffic data.

The developer system 121, the workstation 128, and the device 122 are coupled with the network 127. The phrase “coupled with” is defined to mean directly connected to or indirectly connected through one or more intermediate components. Such intermediate components may include hardware and/or software-based components.

The optional workstation 128 may be a general purpose computer including programming specialized for providing input to the server 125. For example, the workstation 128 may provide settings for the server 125. The settings may include a value for the predetermined interval that the server 125 requests the device 122 to relay current geographic locations. The workstation 128 may be used to enter data indicative of Global Positioning System (GPS) accuracy to the database 123. The workstation 128 may include at least a memory, a processor, and a communication interface.

Figure 5:
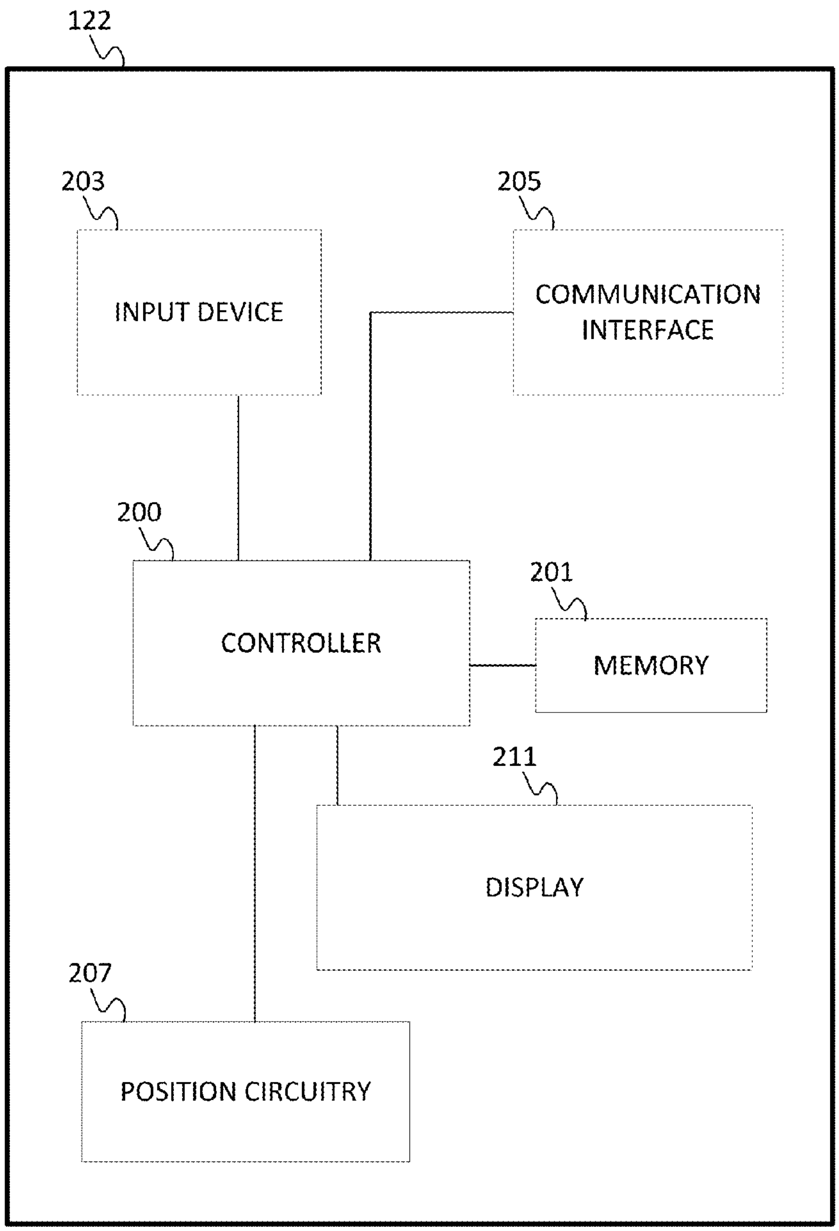
FIG. 5 illustrates an exemplary navigation device of the system of FIG. 4.

FIG. 5 illustrates an exemplary navigation device 122 of the real-time navigation system of FIG. 4. The device 122 includes a controller 200, a memory 204, an input device 203, a communication interface 205, position circuitry 207, and a display 211. Additional, different, or fewer components are possible for the device 122.

The controller 200 is configured to receive data indicative of the location of the device 122 from the position circuitry 207. The positioning circuitry 207, which is an example of a positioning system, is configured to determine a geographic position of the device 122. The positioning circuitry 207 may include sensing devices that measure the traveling distance, speed, direction, and so on, of the device 122. The positioning system may also include a receiver and correlation chip to obtain a GPS signal. The positioning circuitry may include an identifier of a model of the positioning circuitry 207. The controller 200 may access the identifier and query a database or a website to retrieve the accuracy of the positioning circuitry 207 based on the identifier. The positioning circuitry 207 may include a memory or setting indicative of the accuracy of the positioning circuitry.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the device 122. The positioning system may also include a receiver and correlation chip to obtain a GPS signal. The device 122 receives location data from the positioning system. The location data indicates the location of the device 122.

Figure 6:
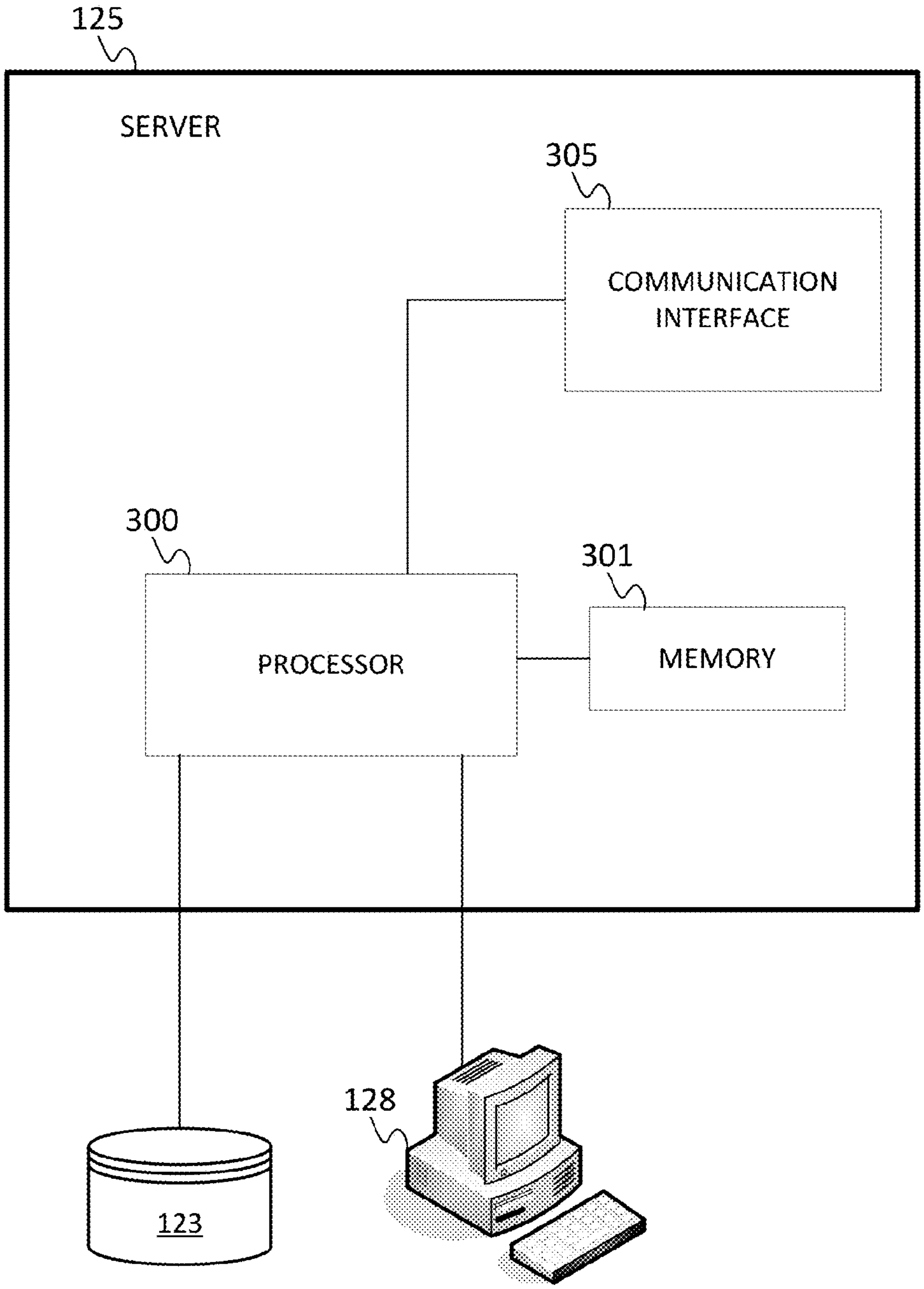
FIG. 6 illustrates an exemplary server of the system of FIG. 4.

FIG. 6 illustrates an exemplary server 125 of the navigation system of FIG. 4. The server 125 includes a processor 300, a communication interface 305, and a memory 301. The server 125 may be coupled to a database 123 and a workstation 128. The database 123 may be a geographic database as discussed above. The workstation 128 may be used as an input device for the server 125. In addition, the communication interface 305 is an input device for the server 125. The communication interface 305 receives data indicative of use inputs made via the workstation 128 or the navigation device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The controller 200 may also be configured to cause a navigation device to at least perform at least one of the methods described above. For example, the controller may be configured to: (1) define a path segment having a starting location and an ending location; (2) define a time interval having a starting time and an ending time; (3) collect and transmit probe data to the processor 300, the probe data including an instantaneous velocity of the navigation device; and/or (4) receive a calculated average speed from the processor 300.

The processor 300 may also be configured to cause an apparatus to at least perform at least one of the methods described above. For example, the controller or processor may be configured to perform the process: (1) retrieve probe data from a plurality of navigation devices, each navigation device traveling over at least a portion of the path segment for at least a portion of the time interval, wherein the probe data for each navigation device comprises an instantaneous velocity of the navigation device; (2) calculate a total distance traveled and a total time traveled by the plurality of navigation devices over the path segment and within the time interval using the instantaneous velocities from the retrieved probe data; and/or (3) determine the average traffic speed for the path segment and time interval based on the calculated total distance traveled and the total time traveled.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the claim scope is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the claim scope or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the claim scope. The claims should not be read as limited to the described order or elements unless stated to that effect. Therefore, all embodiments that come within the scope and spirit of the following claims and equivalents thereto are claimed.

What is claimed is:

1. A method for determining an average traffic speed from a plurality of navigation devices, the method comprising:

providing a path segment having a starting location and an ending location;

providing a time interval having a staring time and an ending time;

retrieving probe data, by a processor, from the plurality of navigation devices, each navigation device traveling over at least a portion of the path segment for at least a portion of the time interval, wherein the probe data for each navigation device comprises an instantaneous velocity of the navigation device;

calculating, by the processor, a total distance traveled and a total time traveled by the plurality of navigation devices over the path segment and within the time interval using the instantaneous velocities from the retrieved probe data; and determining, by the processor, the average traffic speed for the path segment and time interval based on the calculated total distance traveled and the total time traveled, wherein the average traffic speed is determined using the following formula:

$$\overline{v} = \frac{\sum_{v_i \le v_c} v_i \Delta t\left(1 - \frac{v_i}{3v_c}\right) + \sum_{v_i > v_c} \Delta x\left(1 - \frac{v_c}{3v_i}\right)}{\sum_{v_i \le v_c} \Delta t\left(1 - \frac{v_i}{3v_c}\right) + \sum_{v_i > v_c} \frac{\Delta x}{v_i}\left(1 - \frac{v_c}{3v_i}\right)}$$

wherein:

i refers to an $i^{th}$ navigation device of the plurality of navigation devices, a is a constant value;

$\overline{v}$=the average traffic speed, $v_i$=the instantaneous velocity of the $i^{th}$ navigation device, $\Delta x$=a spatial length of the path segment, $\Delta t$=a duration of the time interval, and $v_c=\Delta x/\Delta t$; and outputting the average traffic speed for the path segment and time to a device different than the plurality of navigation devices.

2. The method of claim 1, wherein the probe data for each navigation device further comprises a geographic location of the navigation device, and a timestamp associated with the geographic location and the instantaneous velocity, and wherein the calculating of the total distance traveled and the total time traveled also uses the geographic locations and the timestamps from the retrieved probe data.

3. The method of claim 1, wherein the retrieved probe data from at least one navigation device having a partial navigation path within the path segment and time interval that includes a maximum of one of the following: (1) a beginning of the partial navigation path at the starting location of the path segment, (2) a beginning of the partial navigation path at the starting time of the time interval, (3) an ending of the partial navigation path at the ending location of the path segment, or (4) an ending of the partial navigation path at the ending time of the time interval.

4. The method of claim 1, wherein the calculating the total distance traveled and the total time traveled comprises computing an expectation value for an average distance traveled and an average time traveled based on a uniform probability distribution in location and time across the path segment and the time interval.

5. The method of claim 4, wherein the expectation value is computed using historical probe data.

6. The method of claim 1, further comprising:

transmitting, over a connected network, the determined average traffic speed to an end-user computing device.

7. The method of claim 1, wherein the starting location, the ending location, the starting time, the ending time, or a combination thereof is provided by an end-user computing device.

8. The method of claim 1, wherein the path segment is at least 100 meters and the time interval is at least one minute.

9. A method for determining and transmitting an average traffic speed from a plurality of navigation devices, the method comprising:

providing a path segment having a starting location and an ending location;

providing a time interval having a staring time and an ending time, wherein the path segment and time interval are defined by an end-user computing device in communication with a processor;

retrieving probe data, by the processor, from the plurality of navigation devices, each navigation device traveling over at least a portion of the path segment for at least a portion of the time interval, wherein the probe data for each navigation device comprises an instantaneous velocity of the navigation device, a geographic location of the navigation device, and a timestamp associated with the geographic location and the instantaneous velocity;

calculating, by the processor, a total distance traveled and a total time traveled by the plurality of navigation devices over the path segment and within the time interval using the instantaneous velocities of the plurality of navigation devices;

determining, by the processor, the average traffic speed for the path segment and time interval based on the calculated total distance traveled and the total time traveled; and transmitting, over a connected network, the determined average traffic speed to the end-user computing device, wherein the average traffic speed is determined using the following formula:

$$\overline{v} = \frac{\Sigma_i[\min(x_{max}, v_i(t_{max} - t_i) + x_i) - \max(x_{min}, v_i(t_{min} - t_i) + x_i)]}{\Sigma_i[\min(t_{max}, (x_{max} - x_i)/v_i + t_i) - \max(t_{min}, (x_{min} - x_i)/v_i + t_i)]}$$

wherein:

i refers to an $i^{th}$ navigation device of the plurality of navigation devices, $\overline{v}$=the average traffic speed, $v_i$=the instantaneous velocity of the $i^{th}$ navigation device, $x_i$=the geographic location of the $i^{th}$ navigation device, $t_i$=the timestamp of the $i^{th}$ navigation device, $x_{min}$=the starting location of the path segment, $x_{max}$=the ending location of the path segment, $t_{min}$=the starting time of the time interval, and $t_{max}$=the ending time of the time interval; and outputting the average traffic speed for the path segment and time to a device different than the plurality of navigation devices.

10. An apparatus for determining an average traffic speed from a plurality of navigation devices, the apparatus comprising:

at least one processor; and at least one memory including computer program code for one or more programs; the at least one memory and the computer program code configured to, with the at least one processor, cause the apparatus to at least perform:

retrieve probe data from the plurality of navigation devices, each navigation device traveling over at least a portion of a path segment for at least a portion of a time interval, wherein the path segment comprises a starting location and an ending location and the time interval comprises a starting time and an ending time, and wherein the probe data for each navigation device comprises an instantaneous velocity of the navigation device, a geographic location of the navigation device, and a timestamp associated with the geographic location and the instantaneous velocity;

calculate a total distance traveled and a total time traveled by the plurality of navigation devices over the path segment and within the time interval using the instantaneous velocities of the plurality of navigation devices; and determine the average traffic speed for the path segment and time interval based on the calculated total distance traveled and the total time traveled, wherein the average traffic speed is determined using the following formula:

$$\bar{v} = \frac{\Sigma_i[\min(x_{max}, v_i(t_{max} - t_i) + x_i) - \max(x_{min}, v_i(t_{min} - t_i) + x_i)]}{\Sigma_i[\min(t_{max}, (x_{max} - x_i)/v_i + t_i) - \max(t_{min}, (x_{min} - x_i)/v_i + t_i)]}$$

wherein:

i refers to an $i^{th}$ navigation device of the plurality of navigation devices, $\bar{v}$=the average traffic speed, $v_i$=the instantaneous velocity of the $i^{th}$ navigation device, $x_i$=the geographic location of the $i^{th}$ navigation device, $t_i$=the timestamp of the $i^{th}$ navigation device, $x_{min}$=the starting location of the path segment, $x_{max}$=the ending location of the path segment, $t_{min}$=the starting time of the time interval, and $t_{max}$=the ending time of the time interval; and outputting the average traffic speed for the path segment and time interval to a vehicle.

11. The apparatus of claim 10, wherein the at least one memory and the computer program code are configured to cause the apparatus to further perform:

transmit, over a connected network, the determined average traffic speed to an end-user computing device.

12. The apparatus of claim 10, wherein the retrieved probe data from at least one navigation device having a partial navigation path within the path segment and time interval that includes a maximum of one of the following: (1) a beginning of the partial navigation path at the starting location of the path segment, (2) a beginning of the partial navigation path at the starting time of the time interval, (3) an ending of the partial navigation path at the ending location of the path segment, or (4) an ending of the partial navigation path at the ending time of the time interval.

13. The apparatus of claim 10, wherein the calculating the total distance traveled and the total time traveled comprises computing an expectation value for an average distance traveled and an average time traveled based on a uniform probability distribution in location and time across the path segment and the time interval.

14. An apparatus for determining an average traffic speed from a plurality of navigation devices, the apparatus comprising:

at least one processor; and at least one memory including computer program code for one or more programs; the at least one memory and the computer program code configured to, with the at least one processor, cause the apparatus to at least perform:

retrieve probe data from the plurality of navigation devices, each navigation device traveling over at least a portion of a path segment for at least a portion of a time interval, wherein the path segment comprises a starting location and an ending location and the time interval comprises a starting time and an ending time, and wherein the probe data for each navigation device comprises an instantaneous velocity of the navigation device, a geographic location of the navigation device, and a timestamp associated with the geographic location and the instantaneous velocity;

calculate a total distance traveled and a total time traveled by the plurality of navigation devices over the path segment and within the time interval using the instantaneous velocities of the plurality of navigation devices;

determine the average traffic speed for the path segment and time interval based on the calculated total distance traveled and the total time traveled wherein the average traffic speed is determined using the following formula:

$$\bar{v} = \frac{\sum_{v_i \le v_c} v_i \Delta t\left(1 - \frac{v_i}{3v_c}\right) + \sum_{v_i > v_c} \Delta x\left(1 - \frac{v_c}{3v_i}\right)}{\sum_{v_i \le v_c} \Delta t\left(1 - \frac{v_i}{3v_c}\right) + \sum_{v_i > v_c} \frac{\Delta x}{v_i}\left(1 - \frac{v_c}{3v_i}\right)}$$

wherein:

i refers to an $i^{th}$ navigation device of the plurality of navigation devices, $\bar{v}$=the average traffic speed, $v_i$=the instantaneous velocity of the $i^{th}$ navigation device, $\Delta x$=a spatial length of the path segment, $\Delta t$=a duration of the time interval, and $v_c=\Delta x/\Delta t$; and outputting the average traffic speed for the path segment and time interval to a vehicle.

15. The apparatus of claim 10, wherein the starting location, the ending location, the starting time, the ending time, or a combination thereof is provided by an end-user computing device.

16. The method of claim 1, wherein the constant value for a is 3.

17. The apparatus of claim 10, wherein the vehicle is an autonomous vehicle.

18. The apparatus of claim 10, wherein the vehicle is a highly automated vehicle.

19. The apparatus of claim 14, wherein the vehicle is an autonomous vehicle or a highly automated vehicle.

* * * * *